United States Patent [19]

Mattingly

[11] 4,422,935
[45] Dec. 27, 1983

[54] APPARATUS FOR MAGNETIC TREATMENT OF WATER OR OTHER LIQUIDS

[75] Inventor: Denis A. E. Mattingly, Enfield, England

[73] Assignee: Bernard Strutt Agencies Limited, Kingston-Upon-Thames, England

[21] Appl. No.: 285,123

[22] PCT Filed: Dec. 21, 1979

[86] PCT No.: PCT/GB79/00218

§ 371 Date: Jul. 21, 1981

§ 102(e) Date: Jul. 21, 1981

[87] PCT Pub. No.: WO81/01840

PCT Pub. Date: Jul. 9, 1981

[51] Int. Cl.³ .............................................. C02F 1/48
[52] U.S. Cl. ............................... 210/223; 209/223 R; 209/232; 210/222
[58] Field of Search ........................... 209/223 R, 232; 210/695, 222, 223

[56] References Cited

U.S. PATENT DOCUMENTS

| 1263406 | 4/1918 | Hadley | 209/223 R |
|---|---|---|---|
| 2,317,774 | 4/1943 | Kiek et al. | 210/222 |
| 2,979,202 | 4/1961 | Orbeliani | 209/223 R |
| 3,186,549 | 6/1965 | Botstiber | 210/222 |
| 3,983,033 | 9/1976 | de Latour | 210/695 |
| 4,065,386 | 12/1977 | Rigby | 210/695 |
| 4,153,559 | 5/1979 | Sanderson | 210/222 |

FOREIGN PATENT DOCUMENTS

| 492580 | 12/1948 | Belgium . |
|---|---|---|
| 1642524 | 5/1971 | Fed. Rep. of Germany . |
| 2236788 | 7/1973 | France . |
| 584392 | 1/1947 | United Kingdom . |
| 625732 | 7/1949 | United Kingdom . |
| 675369 | 7/1952 | United Kingdom . |
| 852733 | 11/1960 | United Kingdom . |
| 878525 | 10/1961 | United Kingdom . |
| 1240970 | 7/1971 | United Kingdom . |
| 1288552 | 9/1972 | United Kingdom . |
| 1311794 | 3/1973 | United Kingdom . |
| 1354148 | 5/1974 | United Kingdom . |
| 1423927 | 2/1976 | United Kingdom . |
| 1442198 | 7/1976 | United Kingdom . |
| 2023116 | 12/1979 | United Kingdom . |

Primary Examiner—Peter A. Hruskoci
Attorney, Agent, or Firm—Staas & Halsey

[57] ABSTRACT

An appartus for use in the magnetic treatment of liquids in order to reduce precipitation of dissolved materials. In one embodiment the apparatus subjects liquids to magnetic flux by providing an inlet (2) for the liquid, an outlet (3) for the liquid after it has been subjected to magnetic flux, a fluid flow path connecting the inlet and the outlet, a magnetic body, (4), and material (24) for protecting a sensitive part of the magnetic body from the liquid. In this embodiment the magnetic body includes a first magnetic pole (17) made of material which is sensitive to contact with the liquid and a second magnetic pole (25) of opposite polarity to and spaced from the first magnetic pole to define a gap between the poles. The magnetic poles are so disposed that lines of magnetic flux pass between them and, in so doing, traverse at least part of the fluid flow path.

Claims, 3 Drawing Figures

APPARATUS FOR MAGNETIC TREATMENT OF WATER OR OTHER LIQUIDS

BACKGROUND AND SUMMARY OF THE INVENTION

The invention relates to apparatus for use in the magnetic treatment of liquids particularly, but not exclusively, water for a circulation system.

It is known that certain liquids become so modified when subjected to magnetic flux that material dissolved therein does not precipitate on surfaces with which the liquid comes into contact, or tends less to precipitate on such surfaces. In particular, it is now well known that by subjection to magnetic flux water can be modified in such a manner that solids dissolved therein do not tend or tend less to be precipitated on the internal surfaces of, for example, pipes and heaters which employ circulating water systems for heat removal.

Various apparatus are known for subjecting water and other liquids to magnetic flux. These generally include a flow path through which the liquid, in use of the apparatus, passes and a permanent magnet or electro-magnet which is disposed in the apparatus so that flux traverses the flow path.

There are two aspects to the invention and these are both concerned with the prevention of harm to a magnetic flux source forming part of the apparatus through contact with the liquid to be subjected to the magnetic flux.

In its first aspect, the invention provides an apparatus for use in subjecting a liquid to magnetic flux, which apparatus comprises an inlet for said liquid, an outlet for liquid which has, in use of the apparatus, been subjected to magnetic flux, a fluid flow path connecting said inlet to said outlet, a magnet body comprising a first magnetic pole comprised of a material which is sensitive to contact with said liquid, a second magnetic pole of opposite polarity to and spaced from said first magnetic pole to define a gap between said poles, said magnetic poles being so disposed that, at least in use of the apparatus, lines of magnetic flux pass therebetween and, in so doing, traverse at least part of said fluid flow path, and means which protect said first magnetic pole from contact with said liquid in use of the apparatus. In its second aspect, the invention provides an apparatus for use in subjecting a liquid to magnetic flux, which apparatus comprises an inlet for said liquid, an outlet for liquid which has, in use of the apparatus, been subjected to magnetic flux, a fluid flow path connecting said inlet to said outlet, a magnet body having first and second magnetic poles of mutually opposite polarity and spaced apart to define a gap between said poles, said magnetic poles being so disposed that at least in use of the apparatus, lines of magnetic flux pass therebetween and traverse at least part of said fluid flow path, and means to direct and liquid, in use of the apparatus, through said gap to said outlet without traversing the axial extent of the magnet body.

The expression "sensitive to contact" means that the first pole is susceptible, at least under operating conditions, to chemical and/or electrolytic attack, and consequent damage, by the liquid or a component thereof.

The expression "magnet body" means a body which, at least under operating conditions, acts as a source of the magnetic flux and it will be appreciated that the magnet body may be constructed from one or more ferromagnetic components and may conveniently be a permanent magnet but may alternatively be an electro-magnet which generates flux only when supplied with electric current. In preferred embodiments of the invention, the apparatus will include means to direct the liquid, in use of the apparatus, through the gap to the outlet without traversing the axial extent of the magnet body and will also include means which protect the first magnetic pole from contact with the liquid in use of the apparatus.

The means which protect the first magnetic pole may conveniently comprise non-magnetic stainless steel or brass. It is also possible to protect the first magnetic pole by means of a film, for example a film of plastics material or an applied coating of, for example, a resinous composition such as a varnish.

Conveniently, the fluid flow path is defined in a housing made of non-magnetic material and provided with an aperture to said fluid flow path in which aperture said magnet body is received. For example, the magnet body may comprise a first member of which the first magnetic pole forms part, and a second member of which the second magnetic pole forms part, the two members being in magnetically conductive connection with each other and separated by a magnetically permeable separator which extends into the gap between the poles and protects the first magnetic pole from contact with the liquid in use of the apparatus. The magnet body may conveniently comprise an annular cylinder provided with a core piece in magnetically conductive connection with the cylinder, and a member which is in magnetically conductive connection with the cylinder and which defines the gap with an axial extremity of the core piece. The member referred to may conveniently comprise an annular element including a first portion in magnetically conductive connection with the cylinder and a second portion which terminates in one of the magnetic poles, the second portion defining an aperture in the element which aperture lies in the fluid flow path.

In preferred forms of the invention, the first and second magnetic poles are of such size and shape as to focus the magnetic flux in the gap. For example, the core piece referred to above may be chamfered at its axial extremity, for example as shown in FIG. 3 of the drawings. Another preferred feature of apparatus according to the invention is a construction in which the flow path is so oriented with respect to the gap that, in use of the apparatus, liquid flows through said gap and intersects in a substantially perpendicular fashion the lines of flux passing between the first and second poles.

BRIEF DESCRIPTION OF THE DRAWINGS

Two embodiments of the invention will now be described by way of example only, reference being made to the accompanying drawings in which.

DESCRIPTION OF THE PREFERRED EMBODIMENTS

Figure 1:
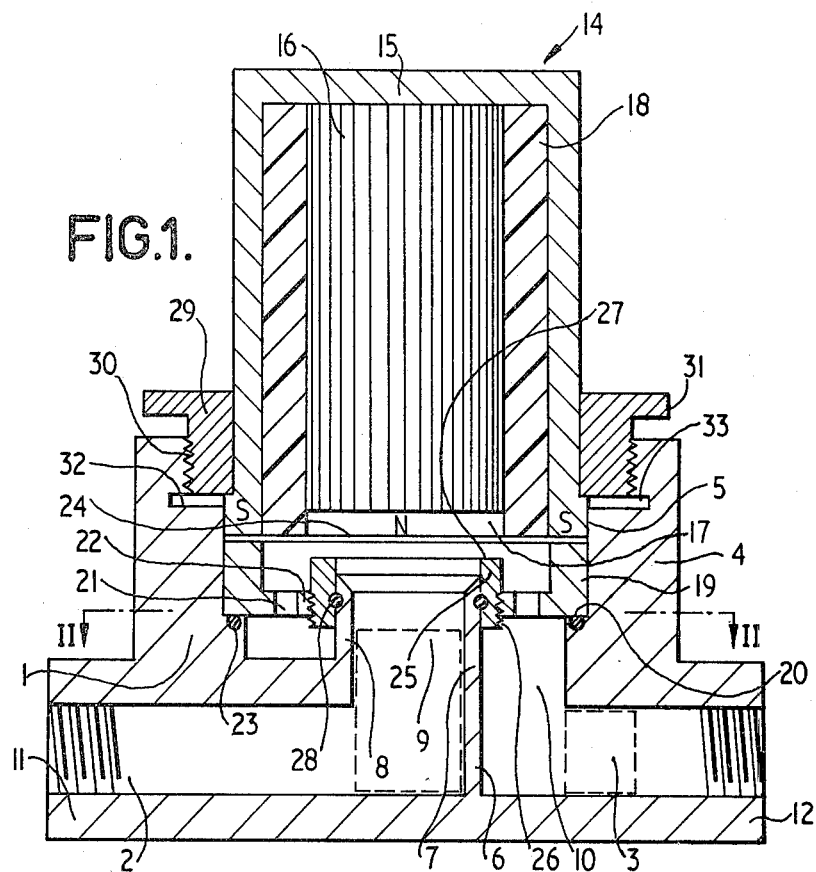
FIG. 1 is a cross-section through a first embodiment of apparatus according to the invention.

The apparatus shown in FIG. 1 comprises a housing 1 made of plastics material (for example, polyacetal such as sold under the trade name "Delvin" or, less preferably, polyamide or rigid polypropylene) and formed with passageways 2 and 3 and with a cylindrical wall 4 which defines a relatively large circular aperture 5.

The passageways 2 and 3 are separated from each other by means of an internal baffle 6. The internal baffle 6 is integral with the housing 1. A semi-cylindrical portion 7 of the internal baffle 6 defines with a semi-cylindrical baffle 8 a chimney 9 which is of circular cross-section and which connects the passageway 2 with the aperture 5. A chimney 10 is defined between the internal surface of cylindrical wall 4 and the surface of the cylindrical portion 7 of baffle 6 which is remote from the chimney 9. The passageways 2 and 3 terminate in internally screw-threaded portions 11 and 12 to which fluid flow lines (not shown) will be connected in use of the apparatus by means of male threaded couplings (not shown).

Received in aperture 5 of the housing 1 is a pot magnet assembly shown generally at 14. The main body of the pot magnet assembly 14 comprises a soft iron annular cylinder 15, a permanently magnetized core 16 made of an aluminium-iron-cobalt based magnetic alloy (for example, an Alnico permanent magnet), a pole piece 17 made of soft iron and an annular cavity 18 which is filled with a non-magnetic filler material (for example, an epoxy resin or a polyester resin). As shown in the drawing, the pole piece 17 has the polarity of a north pole and the axial extremity of the annular cylinder 15 has the polarity of a south pole.

Figure 2:
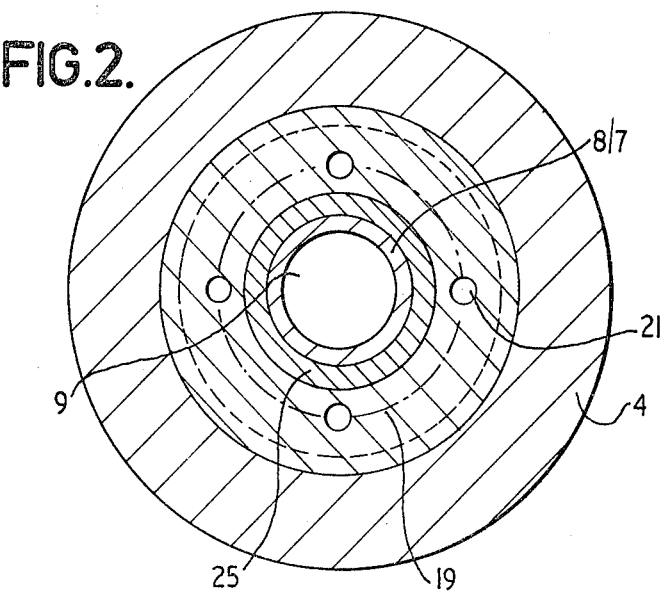
FIG. 2 is a cross-section taken along the line II—II of FIG. 1.

The pot magnet assembly 14 also comprises an annular pole piece 19 which is seated on shoulder 20 formed in the cylindrical wall 4 of the housing 1. The annular pole piece 19 is formed of soft magnetic stainless steel and has a flanged portion 22 formed with ten apertures 21 (of which four only are shown in FIG. 2, for simplicity). The apertures 21 provide communication between the aperture 5 and the passageway 3, and their total aggregated cross-sectional area is substantially equivalent to that of the passageways 2 and 3. An O-ring 23 is provided in the shoulder 20 and in the assembled apparatus provides a fluid seal between the shoulder 20 and the pole piece 19.

A thin separation membrane 24, made of non-magnetic stainless steel, is spot-welded to the pole piece 19 so as in the assembled apparatus to define a gap 27 with the pole piece 25 and to isolate the main body of the pot magnet assembly 14 from fluid being treated in the apparatus. The membrane 24 has a thickness of approximately 0.005 cm. to 0.008 cm. (e.g. either 0.00508 cm. or 0.00762 cm. or a value therebetween).

Received over the chimney-defining baffles 6 and 8 is a further pole piece 25 made of soft magnetic stainless steel and having the form of a short annular cylinder. A sealing ring 28 is provided in the pole piece 25 to effect a seal.

The pole piece 25 is provided with external threads 26 which are in engagement with complementary threads formed on the annular pole piece 19. The pole pieces 19 and 25 can thus be rotated with respect to one another and it will be appreciated that such rotation will enable variation in the size of gap 27. Such rotation can be effected by manual turning of the pole piece 25 when the apparatus is partially disassembled to enable access to aperture 5.

The optimim fluid flow velocity through the gap 27 will normally be from 2 to 3 meters per second and the gap 27 will normally need to be adjustable so as to provide a fluid flow velocity in this range when (as will commonly be the case) the apparatus in use is connected to piping of 0.27 cm. (½ inch) nominal bore carrying a domestic mains water supply of pressure from 60 to 60 psi.

The optimum magnetic flux density in the gap 27 will normally be in the range from 5000 to 8000 gauss over the range of widths to which the gap 27 is adjustable. The arrangement should preferably be such that, with a gap width which provides for an optimum fluid flow velocity, the flux density in the gap 27 is 6000 or 7000 gauss or a value between these flux densities.

The apparatus as a whole will normally be constructed so as to present substantially equivalent effective cross-sectional area (except in the gap 27) to piping of nominal 0.27 cm. (½ inch) bore.

A clamping ring 29 is provided in order securely to retain the main body of the pot assembly 14 in the aperture 5 of the housing 1. The clamping ring 29 is formed with an external thread 30 which engages a complimentary internal thread formed on the internal surface of the upper periphery of the cylindrical wall 4. The clamping ring 29 has a flanged portion 31 of hexagonal form so as to enable engagement therewith of a spanner so that the clamping ring 29 can be turned to apply to a shoulder 32 formed on the main body of the pot magnet assembly 14 a pressure sufficient for the main body to be tightly engaged in the aperture 5. A locking washer 33 is provided adjacent to shoulder 32 to assist in securing the clamping ring 29 in a clamping position.

In use, the apparatus shown in FIGS. 1 and 2 is connected to fluid flow lines (not shown), in the manner previously mentioned, and fluid is caused to flow through the apparatus. The fluid flow may conveniently be from left to right with respect to FIG. 1 although it has been found quite satisfactory for the fluid flow to be in the reverse direction. When flowing from left to right, fluid enters passageway 2 and subsequently is directed upwardly through the chimney 9 and into the cavity defined within the aperture 5 beneath the membrane 24. Fluid then impinges against the surface of the membrane 24 and is directed through the gap 27 and then through the apertures 21 formed in the flanged portion 22 of the pole piece 19. Fluid then enters the chimney 10 and passes through the passageway 3 to the entrance to the outward fluid flow line. On passing through the gap 27, magnetic flux lines pass through the flowing liquid in a direction essentially perpendicular to its direction of flow. As a result, the liquid is modified in such a manner that solids material dissolved therein becomes less likely to be precipitated on the internal surfaces of, for example, pipes and heaters with the surfaces of which the fluid comes into contact.

Figure 3:
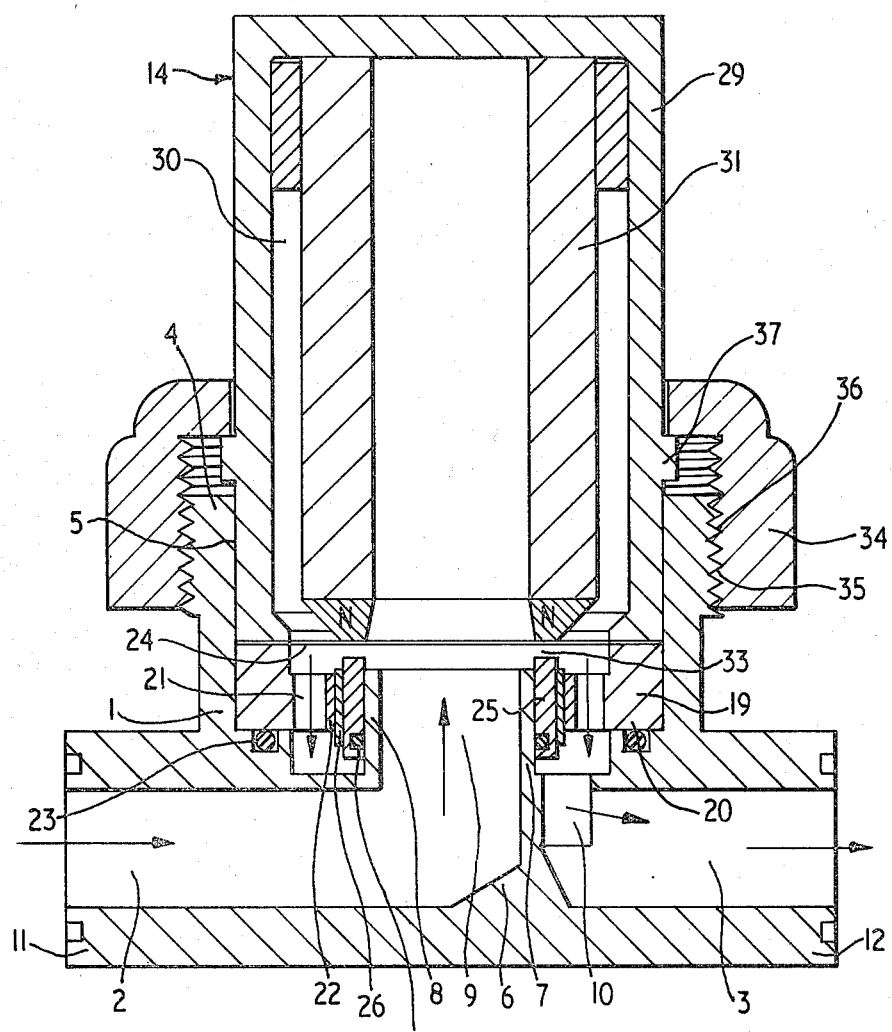
FIG. 3 is a cross-section through a second embodiment similar to but different from the embodiment shown in FIG. 1.

The apparatus shown in FIG. 3 is, as mentioned, similar to the apparatus shown in FIGS. 1 and 2 and, with the exceptions mentioned below, similar components are designated by the same reference numerals as shown in FIGS. 1 and 2. The main differences in construction between the embodiment shown in FIGS. 1 and 2 and that shown in FIG. 3 are that the main body of the pot magnet assembly 14 comprises a soft iron annular cylinder 29 and a cavity 30 in which an annular cylinder 31 made of soft magnetic stainless steel is set in a body of a filler material (for example, an epoxy resin or a polyester resin). The annular cylinder 31 terminates in a chamfered portion 32 bearing a magnetic north pole which defines a gap 33 with the pole piece 25. A clamping ring 34 having internal threads 35 is employed to clamp the main body of the potmagnet assembly in the aperture 5 of the housing 1 by engagement with external threads 36 on the cylindrical walls 3 of the housing 1 and with an annular lug 37 formed in the annular cylinder 29 of the pot magnet assembly. Assembly, disassembly and operation of the apparatus shown in FIG. 3 will be appreciated by reference to earlier description of the apparatus shown in FIGS. 1 and 2. Fluid flow in the FIG. 3 embodiment is indicated by arrows although, as noted with respect to the FIG. 1 embodiment, fluid flow in the reverse direction is also acceptable.

The apparatus shown in the drawings may, as will readily be appreciated by those skilled in the art, be modified in certain respects as a matter of convenience having regard to materials cost and/or availability or to achieve a particular purpose.

In particular, a filter basket may be provided in either or both of the dispositions shown in FIG. 1, in chain lines in the chimneys 9 and 10 in order to filter off from the liquid stream magnetic particles such as the ferromagnetic particles commonly found in the circulation water of heating systems. The filter baskets may be made of a gauze, conveniently stainless steel or nylon gauze. Normally one filter basket only will be provided and disposed so as to filter the liquid input for an apparatus intended for use with one flow direction only but two filters may be provided, as shown in the drawings, as a contingency measure so that an apparatus may be used with reverse flow.

In a further modification, the opposed surfaces of the pole piece 19 and the annular cylinder 15 (shown in FIG. 1 completely separated from each other by the membrane 24) may be in physical connection. For example, such connection may be by means of dowels which extend from one of the opposed surfaces and penetrate apertures in the membrane 24 so as to be received in complementary recesses formed in the other of the opposed surfaces; alternatively, the membrane 24 may be of reduced diameter in relation to the external diameter of the cylinder 15 and pole piece 19, an annular flange being formed peripherally on one of the two opposed surfaces (usually the lower) to define a recessed region in which the membrane 24 is received. Such physical connections would normally, of course, result in a continuity of the material of the cylinder 15 or annular pole piece 19 and this may be of advantage (especially when the membrane 24 is relatively thick) in providing magnetically-conductive connection between the two opposed surfaces. When there is actual engagement between the two opposed surfaces (when, for example, employing dowels as mentioned above), however, the physical connection will in any event provide a means by which pole pieces 19 and 25 can be rotated relative to one another simply by manual turning of the pot magnet assembly 14 and it will be appreciated that this facility is advantageous in that such rotation, and gap width adjustment, can be effected without partial disassembly of the apparatus.

In a still further modification, the housing 1 may alternatively be made of brass or non-magnetic stainless steel and the membrane 24 may alternatively be made of brass.

We claim:

1. An apparatus for magnetically conditioning a stream of water, which comprises:
   a flow-through housing defining a fluid flow-path, the housing having an inlet and outlet connected by said flow path,
   a first magnetic pole provided by a pole piece disposed in said housing, made of a magnetic material resistant to sensitive contact with said water, said pole piece being of hollow cylindrical form and said flow path having a first portion defined within the cylinder of said pole piece and a second portion in a region outside thereof,
   a second magnetic pole provided by a surface made of a material sensitive to contact with said water and disposed in spaced apart juxtaposed relation with respect to said first pole, an annular magnetic gap being defined within the housing by said spacing apart, with said first and second portions of said flow path communicating through said gap, and
   a magnetically-permeable separator disposed in said gap over the water-contacting surfaces of the second pole, said separator protecting said surfaces from contact with said water and permitting magnetic flux to pass through said separator and into said magnetic gap.

2. An apparatus according to claim 1, wherein said separator comprises a thin member selected from the group consisting of stainless steel and brass.

3. An apparatus according to claim 1, wherein the fluid flow path is defined in a housing made of non-magnetic material and provided with an aperture to said fluid flow path in which aperture is received a magnet body including said second magnetic pole with the gap-defining pole surface thereof in said flow path.

4. An apparatus according to claim 3, wherein said magnet body comprises a cylinder provided with a core piece in magnetically conductive connection with the cylinder, a member which is in magnetically conductive connection with said cylinder defining said gap with an axial extremity of said core piece.

5. An apparatus according to claim 1, wherein the second portion of said flow path is in communication with said first portion via said gap for directing fluid flow from said gap to said outlet in a direction the reverse of fluid flow in said first fluid flow path portion.

* * * * *